(12) United States Patent
Regien et al.

(10) Patent No.: US 12,441,504 B2
(45) Date of Patent: Oct. 14, 2025

(54) METHOD FOR AUTOMATICALLY MAINTAINING A PREDETERMINED PORTION ARRANGEMENT IN A TRAY, PACKAGING DEVICE SUITABLE THEREFOR

(71) Applicant: MULTIVAC SEPP HAGGENMUELLER SE & CO. KG, Wolfertschwenden (DE)

(72) Inventors: Sven Regien, Ottobeuren (DE); Markus Berchtold, Wolfertschwenden (DE); Johann Woelfle, Oberguenzburg (DE); Albert Bumann, Groenenbach (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 18/236,564

(22) Filed: Aug. 22, 2023

(65) Prior Publication Data

US 2024/0067379 A1    Feb. 29, 2024

(30) Foreign Application Priority Data

Aug. 29, 2022    (DE) .......................... 102022121774.4

(51) Int. Cl.
*B65B 57/14*    (2006.01)
*B26D 7/06*    (2006.01)
(Continued)

(52) U.S. Cl.
CPC ............ *B65B 57/14* (2013.01); *B26D 7/0625* (2013.01); *B26D 7/32* (2013.01); *B65B 5/068* (2013.01); *B65B 25/06* (2013.01)

(58) Field of Classification Search
CPC .... B26D 2210/02; B26D 7/0625; B26D 7/32; B26D 5/00; B26D 5/007; B26D 7/225;
(Continued)

(56) References Cited

U.S. PATENT DOCUMENTS 3,823,821 A * 7/1974 Wallace .................. B26D 7/30
209/606
3,824,885 A * 7/1974 Marshall ................. B26D 7/30
83/176
(Continued)

FOREIGN PATENT DOCUMENTS

DE    10 2017 112 137 A1    12/2018

OTHER PUBLICATIONS

German Search Report (with English Machine Translation) Dated Jun. 5, 2023, Application No. 10 2022 121 774.4, Applicant MULTIVAC Sepp Haggenmüller SE & Co. KG, 15 Pages.

*Primary Examiner* — Dariush Seif
(74) *Attorney, Agent, or Firm* — Brooks Kushman P.C.

(57)    ABSTRACT

In order to achieve that portions are visually appealing, i.e., centered, with uniform slice distance in a longitudinal direction and also not differing too much in a transverse direction and in particular not resting on a sealing edge of a trough, the corresponding actual arrangement of a portion is determined directly in a packaging machine by means of a camera and, if deviation from a target arrangement is too great, production parameters are changed in an upstream portion production unit, in particular a portioning belt and/or a cutting unit of a slicing machine, and/or an upstream portion delivery unit and/or an upstream package delivery unit.

20 Claims, 8 Drawing Sheets

(51) Int. Cl.
  *B26D 7/32* (2006.01)
  *B65B 5/06* (2006.01)
  *B65B 25/06* (2006.01)
(58) Field of Classification Search
  CPC ....... B65B 25/06; B65B 25/065; B65B 5/068;
       B65B 57/14; A22C 17/0093; A22C
       17/0033; A22C 17/0073; G05B
       2219/45048
  See application file for complete search history.

(56) References Cited

U.S. PATENT DOCUMENTS

| | | | | |
|---|---|---|---|---|
| 3,835,620 A * | 9/1974 | Boltz | B65B 35/50 | 53/157 |
| 3,835,742 A * | 9/1974 | Spooner | B26D 7/30 | 83/77 |
| 3,846,957 A * | 11/1974 | Divan | B26D 5/00 | 53/502 |
| 3,846,958 A * | 11/1974 | Divan | B26D 5/00 | 53/502 |
| 3,995,517 A * | 12/1976 | Smith | B26D 7/30 | 83/13 |
| 4,405,186 A * | 9/1983 | Sandberg | B26D 7/32 | 414/790 |
| 4,875,254 A * | 10/1989 | Rudy | B23Q 17/24 | 83/365 |
| 5,018,338 A * | 5/1991 | Jurchuk | B65B 35/36 | 53/251 |
| 5,109,936 A * | 5/1992 | Ruppel | B26D 7/30 | 177/25.19 |
| 5,123,231 A * | 6/1992 | Fallas | B65G 47/31 | 53/538 |
| 5,324,228 A * | 6/1994 | Vogeley, Jr. | A22C 17/0086 | 452/158 |
| 5,419,677 A * | 5/1995 | Cohn | B65B 25/08 | 414/789.5 |
| 5,787,776 A * | 8/1998 | Nishimoto | B26D 7/32 | 83/92 |
| 6,520,314 B1 * | 2/2003 | Seiling | B65B 25/16 | 198/377.01 |
| 6,595,739 B1 * | 7/2003 | LaPlace | B65G 21/2036 | 198/689.1 |
| 6,640,681 B1 * | 11/2003 | Weber | B26D 7/18 | 83/155.1 |
| 6,827,545 B2 * | 12/2004 | Ward | B65G 17/24 | 414/794.8 |
| 6,882,434 B1 * | 4/2005 | Sandberg | A22C 17/0033 | 250/559.22 |
| 7,069,845 B2 * | 7/2006 | Righele | B65B 57/06 | 99/441 |
| 7,251,537 B1 * | 7/2007 | Blaine | A22C 17/0086 | 700/173 |
| 7,413,070 B2 * | 8/2008 | Mayer | B65G 47/715 | |
| 7,581,474 B2 * | 9/2009 | Weber | B26D 5/00 | 83/88 |
| 8,233,668 B2 * | 7/2012 | Jing | G06V 10/267 | 382/110 |
| 8,820,202 B2 * | 9/2014 | Schaub | B26D 7/32 | 83/932 |
| 8,893,599 B2 * | 11/2014 | Reifenhaeuser | B26D 7/32 | 83/29 |
| 9,221,615 B2 * | 12/2015 | Bauer | B26D 7/32 | |
| 9,296,120 B2 * | 3/2016 | McLaughlin | B26D 7/30 | |
| 9,975,264 B2 * | 5/2018 | Weber | B26D 7/32 | |
| 10,065,335 B2 * | 9/2018 | Mayer | B65G 47/68 | |
| 10,350,779 B2 * | 7/2019 | Seager | B26D 7/00 | |
| 10,721,947 B2 * | 7/2020 | Blaine | G01N 33/02 | |
| 10,869,489 B2 * | 12/2020 | Blaine | A22C 17/0086 | |
| 11,337,432 B1 * | 5/2022 | Tao | A22C 29/025 | |
| 11,932,496 B2 * | 3/2024 | Sjerps | B65G 15/105 | |
| 2002/0050198 A1 * | 5/2002 | Kuchler | B26D 7/01 | 83/717 |
| 2003/0145700 A1 * | 8/2003 | Lindee | B26D 7/32 | 83/29 |
| 2003/0196871 A1 * | 10/2003 | Jones, Jr. | B65G 21/14 | 198/460.3 |
| 2003/0233918 A1 * | 12/2003 | Lindee | A22C 17/0033 | 83/13 |
| 2004/0016331 A1 * | 1/2004 | Wolcott | B26D 7/32 | 83/768 |
| 2004/0031363 A1 * | 2/2004 | Lindee | B26D 7/0683 | 83/84 |
| 2007/0006700 A1 * | 1/2007 | Lunghi | B26D 7/32 | 83/167 |
| 2007/0089967 A1 * | 4/2007 | Pryor | A21C 9/085 | 198/331 |
| 2007/0214923 A1 * | 9/2007 | Maier | B26D 5/007 | 83/37 |
| 2009/0038453 A1 * | 2/2009 | Malenke | B65B 57/14 | 83/23 |
| 2009/0038913 A1 * | 2/2009 | Malenke | B65B 25/08 | 271/176 |
| 2009/0137195 A1 * | 5/2009 | Bottemiller | B26D 5/007 | 700/173 |
| 2009/0249749 A1 * | 10/2009 | Schill | A22C 25/04 | 53/514 |
| 2010/0066824 A1 * | 3/2010 | Burton | A22C 17/0086 | 382/110 |
| 2010/0101191 A1 * | 4/2010 | Lindee | B26D 5/007 | 53/391 |
| 2010/0256810 A1 * | 10/2010 | Weber | B65G 47/24 | 198/398 |
| 2011/0232440 A1 * | 9/2011 | Weber | B26D 7/0683 | 83/73 |
| 2012/0042758 A1 * | 2/2012 | Weber | B26D 7/325 | 83/401 |
| 2012/0055760 A1 * | 3/2012 | Viglundsson | B65B 25/065 | 198/572 |
| 2012/0159900 A1 * | 6/2012 | Grasselli | B65G 47/90 | 53/235 |
| 2012/0198975 A1 * | 8/2012 | Lindee | B26D 7/30 | 83/73 |
| 2012/0207578 A1 * | 8/2012 | Pryor | A22C 17/10 | 414/801 |
| 2012/0324840 A1 * | 12/2012 | Lang | B65G 47/244 | 53/544 |
| 2013/0042579 A1 * | 2/2013 | Rother | B65B 41/08 | 53/64 |
| 2013/0231757 A1 * | 9/2013 | Rother | B26D 5/00 | 700/83 |
| 2013/0291483 A1 * | 11/2013 | Van Gerwen | A22C 7/0069 | 53/113 |
| 2015/0321369 A1 * | 11/2015 | Froese | B26D 7/30 | 53/514 |
| 2016/0165906 A1 * | 6/2016 | Lasslop | A23C 19/14 | 53/493 |
| 2016/0332823 A1 * | 11/2016 | Yang | B65H 33/16 | |
| 2017/0210023 A1 * | 7/2017 | Hocker | B26D 5/007 | |
| 2018/0118388 A1 * | 5/2018 | Grasselli | B65B 5/101 | |
| 2018/0345520 A1 * | 12/2018 | Eckhardt | B26D 5/00 | |
| 2020/0230838 A1 * | 7/2020 | Einloft-Velte | B26D 1/565 | |
| 2020/0307916 A1 * | 10/2020 | Schröder | B65G 21/12 | |
| 2020/0375203 A1 * | 12/2020 | Pfanstiel | B26D 5/007 | |
| 2021/0323186 A1 * | 10/2021 | Hartmann | B26D 5/42 | |
| 2022/0032487 A1 * | 2/2022 | Bauer | B26D 7/0683 | |
| 2022/0153531 A1 * | 5/2022 | Arend | B26D 1/143 | |
| 2023/0034751 A1 * | 2/2023 | Voelkl | B65B 57/16 | |
| 2023/0090630 A1 * | 3/2023 | Mueller | B65B 25/08 | 198/460.1 |
| 2023/0242297 A1 * | 8/2023 | Botzenhardt | B65B 57/00 | 53/452 |
| 2023/0339639 A1 * | 10/2023 | Carboni | B65B 35/56 | |
| 2024/0000088 A1 * | 1/2024 | Kjaer | G06K 19/06028 | |
| 2024/0067379 A1 * | 2/2024 | Regien | B65B 25/065 | |
| 2024/0308099 A1 * | 9/2024 | Bialy | B26D 5/007 | |

\* cited by examiner

METHOD FOR AUTOMATICALLY MAINTAINING A PREDETERMINED PORTION ARRANGEMENT IN A TRAY, PACKAGING DEVICE SUITABLE THEREFOR

CROSS-REFERENCE TO RELATED APPLICATIONS

This application claims priority to German Patent Application No. DE 102022121774.4 filed on Aug. 29, 2022, the disclosure of which is incorporated in its entirety by reference herein.

TECHNICAL FIELD

The invention relates to the arrangement of a portion consisting of several slices, in particular shingled, on a packaging element, in particular in a tray of a tray conveyor.

BACKGROUND

The portion deposited on such a packaging element, in particular in the trough, should have the correct size and shape and be deposited in the, e.g., trough in the correct position, so that an optically attractive appearance results, for example, lie centrically in the trough, and above all do not lie on the sealing edge surrounding the trough, since this prevents a tight sealing of a sealing film closing the trough.

The portions to be packed—i.e., deposited and sealed—in the packaging machine are usually sliced upstream of it by a high-performance slicing machine, a so-called slicer, from bar-shaped product strands, the so-called calibers, usually in multiple tracks next to each other by the same blade, for example a rotating sickle blade.

Each cut slice falls onto a discharge unit, which usually consists of three conveyor belts following one after the other in the conveying direction, the first of which, the so-called portioning belt, is usually adjustable in many ways and can be driven step by step, on which the slices of one track hit one after the other at a certain distance, so that, for example, a shingled portion is produced.

From this discharge unit—which can be an independent unit, but is usually a component of the slicer, since both the discharge unit, in particular the portioning belt, must be controlled in exact temporal and spatial coordination with the movement of the slicer in order to produce correct positions—the portions transported away from the slicer in multiple tracks are usually not fed or inserted directly into the packaging machine, but there is an insertion belt in between, usually a conveyor belt which is continuous in width over all tracks. This so-called feeder is usually inclined downwards in the conveying direction and discharges the portions transported into the troughs formed in several rows next to each other in a trough belt according to the number of tracks, which passes under the feeder.

Due to a large number of influencing factors, such as
the centrifugal force generated by the rapidly rotating blade,
the adhesion of the slices to the blade,
the non-constant accelerations of all tracks of the discharge unit in the case of track-individual discharge units,
the portions may already on the portioning belt not be in the desired, predetermined shape or size or relative position of the portions to each other.

For example, the portion may be too long or too short, the longitudinal spacing of the slices within the portion may be uneven, or the slices may not lie in exactly one row in the longitudinal direction, but may have too great a lateral offset from one another, which has so far been attempted to be corrected in part already within the discharge unit or on the portioning belt.

Therefore, it is known to detect the position of the portions and their individual slices by means of a camera already in the discharge unit of the slicer, for example on the portioning belt, partly still during the formation of the portion, and to improve the design of the portion at least for subsequent portions by readjusting the production parameters, among other things by moving the individual tracks or the entire portioning belt in transverse direction between the impact of two successive slices.

However, even if the portion produced on the portioning belt corresponds to the target specifications there, subsequent movements of the portion up to the packaging element, for example transfers between individual conveyors, in particular to the inclined feeder, and/or further transfers due to a buffer arranged between the discharge unit of the slicer and the feeder, may result again in undesirable changes in the size, shape and position of the portions.

SUMMARY

It is therefore the object according to the invention to provide a method with which portions with a predetermined shape, size and depositing position can be produced on a packaging element, in particular in the tray trough of a trough belt or of an already separated tray, and to provide a related packaging device consisting of a packaging machine on the one hand, and on the other hand a packaging or package delivery unit, a portion delivery unit and a portion production unit.

First of all, it should be clarified that a portion arrangement of the portion on or in a packaging element is understood to mean not only the portion position as a whole relative to the packaging element, but also the arrangement within the portion, that is, for example, the measured length as seen in the transport direction or the width of the portion as measured horizontally transversely thereto, or the height of the portion, the latter in particular in the case of folded slices within the portion, or also the shape of the portion, for example, the relative position of the individual slices with respect to one another with respect to offset in the longitudinal or transverse direction. Also the position of the packaging element to at least one stationary, reference point can be part of the portion arrangement.

The target arrangement describes the ideal state for each of these arrangement parameters in the form of a target arrangement value, and an associated tolerance range—which can extend on one side or both sides of the ideal value of the target arrangement—describes the range in which the actual arrangement of the portion is still accepted as tolerable and no change is made to a production parameter, in particular to the production parameter influencing this measured value.

Furthermore, it should be clarified that the production parameters of the upstream units are understood to be all parameters of these units which can be controlled at this unit and which have an influence on the portion arrangement, i.e., for example, blade speed, cutting gap, speed of the portioning belt or of one of the other belts in the case of clocked operation, the standstill time between the individual step movements, the speed-time diagram of these movements, the absolute position of one of the belts in the longitudinal or transverse direction at a reference time or in a reference state.

With regard to the method for automatically achieving a predetermined portion arrangement of a portion deposited on a packaging element—for example in a packaging trough of a trough belt—in particular a shingled portion consisting of several slices, the existing object is achieved in that first, in the deposited state of the portion, the actual state of the portion arrangement, i.e., the actual arrangement, is determined, this actual arrangement is compared with respect to its relevant arrangement values with the specified target arrangement, i.e., the target arrangement values specified within the framework of the target arrangement, if a deviation of the actual arrangement from the target arrangement is determined for at least one arrangement value by more than the tolerance value additionally specified for this target arrangement value, i.e., an actual arrangement outside the tolerance range of the target arrangement, at least one of the production parameters of the upstream units is automatically changed in such a way that a portion produced with this changed production parameter and deposited on the packaging element has an actual arrangement which does not deviate from the target arrangement by more than the specified tolerance values, i.e., lies within the tolerance range around the desired arrangement value.

As a result, the desired target arrangement of the portion relative to the packaging element can be achieved in the deposited state, since all possibly negative influencing factors on the portion arrangement lie between the location and time of the production parameters and the state in which the actual arrangement is determined.

For this, a feedback from the place of the determination of the actual arrangement, namely already in the packaging machine, and the place at which the production parameters for this actual arrangement act on the portion, is necessary in data-technical regard, so that for this the control (i.e., control unit, controller or control system) of the packaging machine must be data-technically connected with that control, which controls the appropriate production parameter and reports the instruction regarding the change concerning quality and quantity of a defined production parameter also to this control.

The upstream units in which the production parameters are present and act on the portion can be either the packaging delivery unit, i.e., the unit which, for example, transports the trough belt, or the portion delivery unit, i.e., the unit, usually consisting of one or more belt conveyors arranged one behind the other, which delivers the portion already produced to the packaging machine.

However, this upstream unit can also be the portion generation or production unit, which generates the portion in the first place. In a common slicer, this is the cutting unit that drives the blade that separates the individual slices from the caliber together with the portioning belt of the discharge unit, which is usually part of the slicer, because it is in the interaction between the function of the portioning belt and the cutting unit that the portion is produced.

As a rule, the determination of the actual arrangement of the portion on the packaging element is carried out in a non-contact manner, for example, by optical means such as a camera or another non-contact sensor, in order to avoid any mechanical influence on the portion.

As a rule, the actual arrangement is determined when the packaging element is stationary, and preferably as soon as possible after the portion has been placed on or in the packaging element. This means, if possible, immediately after the packaging element has stopped, because the depositing—which is a dropping from the last conveyor of the portion delivery unit—is usually carried out on the packaging element with the packaging element running in the transport direction, in order to have the differential speed between the dropped portion and the packaging element on which it hits at the moment of impact as low as possible, preferably at zero, and thus to avoid a slipping of the portion on the packaging element at the moment of impact.

Deviations of the target arrangement from the actual arrangement may also be caused by random and uniquely or rarely occurring factors, for example insufficient static friction on only one or a few of the packaging elements.

It is not the aim of the present application to eliminate such randomly or uniquely or rarely occurring deviations of the actual arrangement from the target arrangement of the portion, especially since this is usually also not possible, since the reason causing this is often not known and determinable. Instead, system errors that cause a repetitive deviation of the actual arrangement from the target arrangement are to be eliminated.

Therefore, even if the actual arrangement lies outside the tolerance ranges of the at least one tolerance range of the target arrangement, the production parameters are preferably only changed if the detected deviation has been determined to be a repetitive error.

This means, for example, that the detected deviation has been detected at least 3 times, in particular at least 5 times, in particular at least 7 times, directly one after the other, i.e., without correct actual arrangement in between, or at least 6 times, preferably at least 8 times within ten successive determination processes.

The actual size of the detected deviation is irrelevant, as long as it is an impermissibly high deviation, i.e., beyond the tolerance value.

The specified target arrangement can be defined by various arrangement values as well as the respective associated tolerance values, as the respective associated tolerance range, whereby the actual arrangement is only correct if it complies with all arrangement values, i.e., lies within all tolerance ranges.

A particularly disadvantageous actual arrangement of the portion is when, when arranged in a packaging trough, it partially rests on the edge surrounding the trough, which is usually used as a sealing edge for sealing on a sealing film, so that an edge of a portion resting there, for example, prevents the sealing film from being sealed on tightly and thus the corresponding package would remain leaky.

A similar thing can also happen with a plate-shaped packaging element if the portion protrudes over the edge of the packaging element and thus prevents the sealing film, which is placed over it and is generally tightly fixed on the back of the packaging element, from being folded over. In the longitudinal direction, i.e., the transport direction, the risk of the portion resting on the sealing edge surrounding the trough is naturally greater than in the transverse direction.

The target arrangement therefore comprises as arrangement parameters a positive target start distance and a positive target end distance in the longitudinal direction—the transport direction of the portions transported upstream—between the portion and the start on the one hand and the end of the packaging element, in particular the start or end of the trough and the portion on the other.

If this positive distance is exceeded by more than the stored tolerance value—which in particular corresponds to a maximum of this positive distance—or if there is even a negative actual initial distance, i.e., a protrusion of the portion in the longitudinal direction, in particular over the edge of the trough to the front or rear, the at least one production parameter determining this position is changed in the direction of achieving a positive target initial distance within the tolerance range.

For example, the delivery speed of the upstream portion delivery unit can be reduced in order to reduce the ejection speed of the portion in the direction of the packaging element or, conversely, the delivery speed of the upstream packaging delivery unit at which the packaging element moves at the time the portion hits it can be increased if the front actual initial distance was positive but too small or was even negative. If the actual end distance is too small or even negative, the opposite procedure is followed.

The change is made—if necessary step by step with the actual portion arrangement always being determined in between—to such an extent that a permissible positive target initial distance is reached.

The target arrangement can also specify a right and left target transverse spacing.

If the actual transverse distance to the left or right is too small, the transverse offset of a conveyor belt following the portioning belt, for example, or the transverse positioning of the portioning belt itself at the time of impact of the slice is changed as a production parameter so that the portion arrives on the packaging element in such a transverse position that is within the intended tolerance range.

The portion should not only lie completely within the dimensions of the packaging element, in particular the trough, but should also lie within it in an optically appealing manner, i.e., lie as centrally as possible on it or in it.

For this purpose, positive target distances from the front, rear or both sides of the packaging element, in particular the trough, can also be specified within the framework of the target arrangement, as for avoiding the portion resting on the packaging element, in particular the trough, beyond the front, rear or both sides of the packaging element, in particular the trough, but then the tolerance values and the tolerance range defined thereby with regard to the respective target distance are specified much more narrowly, namely so narrowly that in the case of a portion ending within the respective front rear or side tolerance range, this is perceived by the consumer as a centric position.

Which production parameter can be changed in which direction in order to change an unacceptable actual arrangement in subsequent portions so that the target arrangement is achieved corresponds to the measures described above.

Furthermore, the portion arrangement should also present a visually appealing image within the portion:

For example, the spacing in the longitudinal direction of the shingled portion within the portion should all be approximately equal.

In this case, a target slice spacing is also specified within the target arrangement, which is the spacing in the longitudinal direction between two slices, for example the respective front end of the slice, which are generally all of the same size, as well as an associated positive and negative tolerance value.

If at any point of the portion the actual longitudinal distance lies outside the tolerance range provided for this purpose, for example is too small, the feed speed and/or feed distance of the portioning belt between the impact of these two slices of the portion is increased as a production parameter, and reduced in the opposite case, so that after changing this production parameter the actual longitudinal distance corresponds to the target longitudinal distance, i.e., lies within its tolerance range.

Regardless of the distances within the portion and regardless of a possibly given centric position of the portion within the packaging element, the portion length can be too large or too small.

To avoid this, the target arrangement can have as arrangement parameter the target length of the portion in longitudinal direction including a positive and negative tolerance value, i.e., a tolerance range.

If the actual length of the portion is determined to be outside the corresponding tolerance range, the corresponding production parameter is changed, for example the feed speed or feed distance of the portioning belt between the impact of two successive slices of the portion is reduced, if the actual length was greater than the largest tolerated target length and vice versa.

This change is also made to such an extent that the subsequent portions have the actual length corresponding to the target length, which should always mean that the actual size is within the tolerance range of the target size.

For a visually appealing, in particular single-row, shingled portion, the transverse offset between the slices, in particular two slices of a portion following each other in the longitudinal direction, is also of importance.

For this purpose, the specified target arrangement can contain a maximum permissible target transverse offset including a corresponding tolerance value, if necessary separately for two consecutive slices or for the total transverse offset between the leftmost and rightmost slice of a single-row shingled portion.

If the actual offset is greater than the maximum permissible target offset, i.e., outside its tolerance range, the corresponding production parameter of the one or more upstream portion forming units is changed so that the actual offset is within the tolerance range of the target offset with the changed production parameter.

Depending on the design of the portion generation unit, these can be different production parameters, for example the size of a transverse offset by which the portioning belt is moved between the impact of two slices in the transverse direction, in order to deposit the individual slices on the same transverse position of the portioning belt, offset in the longitudinal direction, as far as possible, despite their different impact positions in the transverse direction.

If the target arrangement has a maximum permissible target transverse distance between the leftmost and rightmost slices, i.e., a target transverse width, it can be sufficient to deposit only the leftmost and/or rightmost slice further in the direction of the longitudinal center of the portion for subsequent portions by changing the production parameter in order not to exceed the maximum target transverse width and its tolerance range or the specified target transverse distance from the edge of the packaging element, in particular the trough.

The at least one production parameter to be controlled for this purpose is the same as described above.

For the correct arrangement of the portion on the packaging element, it is not only important to have the correct point of impact when the portion is dropped in the direction of the packaging element, but also that the packaging element, in particular the trough of a trough belt, is then located at the correct point of impact, i.e., a selected reference point of the environment of the packaging element, in the longitudinal and transverse direction.

For this purpose, the predetermined desired arrangement may comprise a desired longitudinal packaging distance, in particular a desired longitudinal trough distance, in the longitudinal direction at which, at the time of the start of the depositing, the distance between a point of the packaging, in particular the edge of the trough, such as the start of the packaging, and the reference point should be. This target longitudinal packing distance can also be zero if the reference point of the environment at the start of depositing or at the time of determining the actual arrangement is to be the same as the selected reference point of the packing.

Since at the time of dropping the portion, the trough belt itself is moving relatively fast, determining its position in the moving state can be difficult. Since the trough belt is stopped after each discharge, and the running time in between usually remains the same, the determination of the actual position of the trough can also be carried out in the stationary state.

In addition, at least one tolerance value, such as a positive and a negative tolerance value, and thus a tolerance range, is also defined here.

If the packaging element in the actual arrangement lies behind the reference point in the transport direction, the longitudinal direction, of the packaging, i.e., the target packaging longitudinal distance is greater than the actual packaging longitudinal distance, the delivery speed of the upstream packaging delivery unit is preferably increased as a production parameter, at least temporarily, in such a way that the actual packaging longitudinal distance then lies within the tolerance range around the target packaging longitudinal distance. If the actual longitudinal packing distance is too small, the procedure is reversed.

In the case of portions containing folded slices, it can happen that the portion deposited on the packaging element is too high, i.e., in particular in the case of a portion deposited in a trough, this portion projects upwards over the edge of the trough.

Since this has the effect that a sealing film placed over it and sealed onto the edge around the trough cannot be placed flat, but instead bulges upwards—which either leads to the sealing film being sealed tightly around the trough and/or is interpreted by the consumer as bloated packaging and thus spoiled contents, the specified target arrangement can comprise a positive target height distance in the vertical direction between the upper end of the portion and the upper edge of the trough, as well as a tolerance value for this.

If the actual arrangement has an upper end of the portion that projects upward beyond the upper edge of the trough, i.e., has a negative actual height distance, the production parameter of the upstream portion production or generation unit and/or portion delivery unit that is relevant for the height of the portion is changed accordingly, for example, the rotational speed of a rotating folding rod and/or the quantity and speed of the air flow exiting from the air outlet openings of a hollow folding rod is changed positively or negatively to such an extent that with the changed production parameter there is no longer a negative actual height distance of the next portion, i.e., the relevant actual arrangement of the portion corresponds to the desired arrangement in that it lies in the corresponding tolerance range.

In general, it should be mentioned that a tolerance value for a corresponding deposit parameter can either be a tolerance value pointing only in the positive or only in the negative direction from the target value the tolerance value can be defined as an absolute value or as a relative value, e.g., a percentage value, relative to the set value.

The automatic control of the packaging device, in particular of the slicing machine if such a machine is installed upstream of the packaging machine—includes controlling the speed of the continuously or stepwise running portioning belt as well as its standstill intervals and/or the control of the step length of the stepwise running portioning belt and/or controlling the time interval between the individual separation processes and/or the speed of the blade (3)

and/or the speed and/or distance of the transverse offset of a transverse offset belt and/or the feed force of the upper and/or lower product guide (8, 9)

and/or running speed and/or transverse position of the trough belt (22), in particular at the time of portion discharge and/or running speed of the feeder (21), in particular at the time of portion discharge.

With regard to a packaging device comprising:

a packaging machine, in particular with a deep-drawing station for the production of the troughs in a bottom film and/or a tray sealer for packaging a portion of slices deposited on a packaging element, in particular in a tray, in particular shingled, and a portion delivery unit which delivers the portions to the packaging machine, and a portion production unit which produces the portions, in particular a slicer, with a cutting unit and a portioning belt which can be driven in a controlled manner in relation thereto, and a packaging delivery unit which delivers the packaging elements to the packaging machine, the existing object is achieved in that the packaging machine has at least one sensor for determining the portion arrangement after it has been deposited relative to the packaging element on which it lies, in particular in the packaging trough.

In this case, the sensor is data-technically connected to the control system (e.g., control unit) of the packaging machine and this control system is designed in such a way that it can control the production parameters which have an influence on the portion arrangement, even in the case of the portion production unit and/or portion delivery unit and/or packaging delivery unit which is upstream of the packaging machine and in particular represents a separate machine with a separate control system.

In particular, the packaging device, especially its control system, is designed to carry out the previously described process.

Thereby, an actual arrangement of the portion on or in the packaging element can be achieved, which corresponds to a predetermined target arrangement of the portion.

As a rule, the packaging machine will have its own control system for this purpose, which will have a data link with the controls of the upstream units. Only rarely will there be a central control system covering all these machines and units, but this cannot be ruled out.

The discharge unit for the portions produced, in particular its stepwise controllable portioning belt, is part of the portion production unit, which as a rule also includes at least the cutting unit of the upstream slicing machine.

The discharge unit, in particular including its portioning belt, is generally part of the slicing machine and is controlled by the same control system, but can also be a separate unit with its own control system, which is then connected to and exchanges data with the control systems of the other units and machines.

Preferably, the portion delivery unit is functionally, in particular also spatially, arranged between the portion production unit, in particular its portioning belt, and the packaging machine.

BRIEF DESCRIPTION OF THE DRAWINGS

Embodiments according to the invention are described in more detail below by way of example and with reference to the following drawings, which show.

DETAILED DESCRIPTION

Figure 1A:
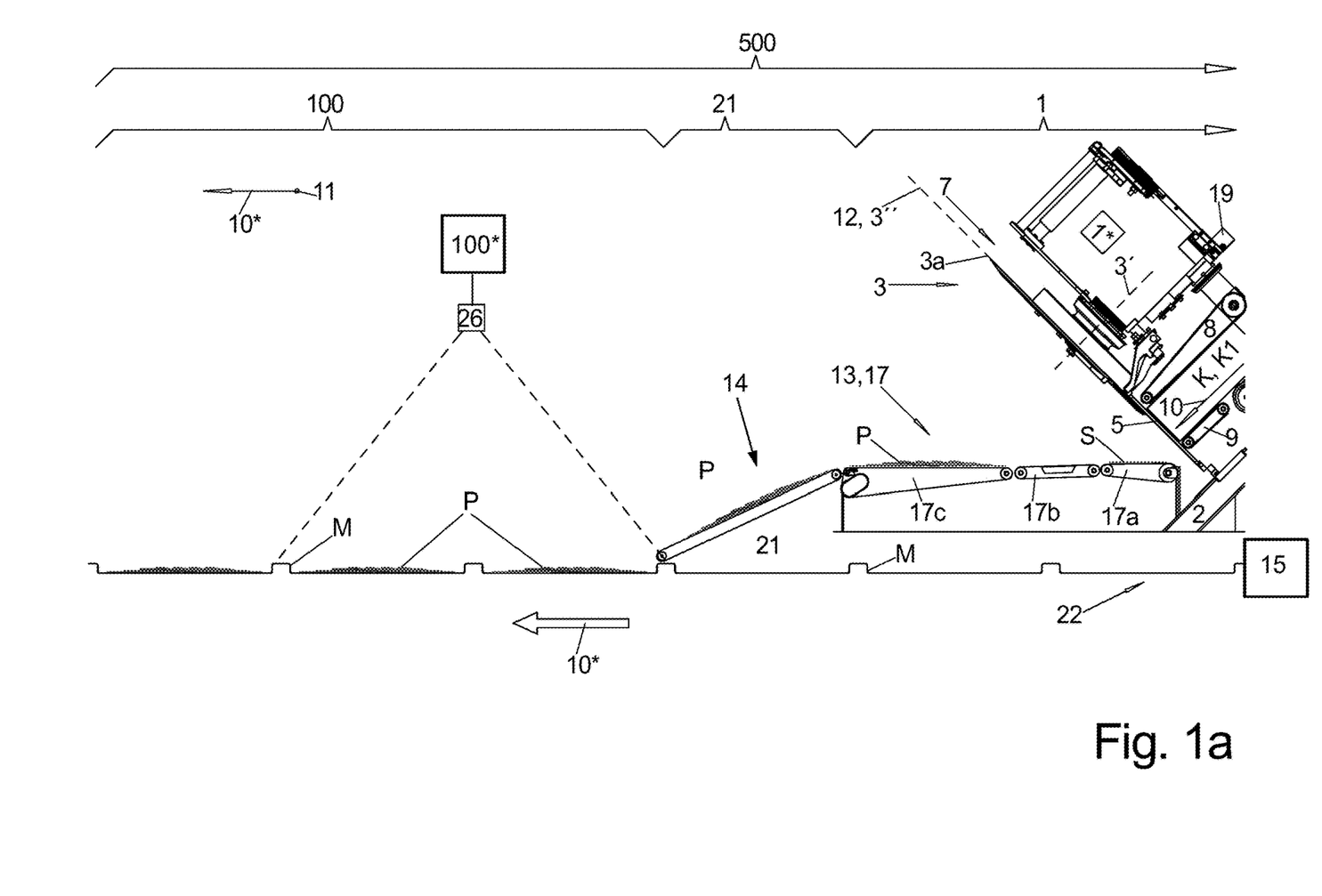
FIG. 1a: a packaging device consisting of a slicer as well as a packaging machine arranged downstream in the longitudinal direction, the passage direction through the device, with an insert, viewed in the side view, the width direction of the packaging device.

FIG. 1a shows a side view of a packaging device 500 with—in the passage direction 10* through the entire unit—a slicer 1, a feeder 21 and a packaging machine 100.

Of the slicer 1, which is only partially shown, the cutting unit 7 is visible, as well as of the feed for the calibers K the upper product guide 8 and the lower product guide 9, between which the calibers K are held and fed to the cutting unit 7 in a feed direction 10 which is at an angle to the horizontal passage direction 10* through the entire device.

The blade 3, whose sharply ground cutting edge 3a defines the cutting plane 3", lies at a very small distance parallel to the underside of the plate-shaped cutting frame 5, in which several calibers K1, K2 located one behind the other in the viewing direction of FIG. 1a are received and sliced at the same time, so that the circumferential edge of the cutting frame 5 and its product openings form the fixed counter-blade to the cutting edge 3a of the blade 3.

Not only the cutting unit 7 and the feed for the calibers K are fastened to the base frame 2 of the slicer 1, but also, as a rule, a discharge unit 17, which consists of three discharge conveyors 17a, b, c located one behind the other in the passage direction 10*, the first of which, portioning belt 17a, can be pivoted in various ways in its inclined position about a pivot axis running in the direction of view of FIG. 1a, so that it can be controlled with which angle of impact and with which trajectory and distance the slices S separated from the caliber K strike the portioning belt 17a. By driving the portioning belt 17a in a controlled stepwise manner, shingled portions P can be produced thereon, for example.

A trough belt 22 is fed under the slicer 1, also from right to left in the passage direction 10*, in each of whose troughs M a portion P is to be deposited.

In order to compensate for the height offset between the trough belt 22 and the generally horizontally higher discharge unit 17, the last discharge conveyor 17c of the discharge unit 17 is followed by a so-called feeder 21. This is also a conveyor belt which runs in the passage direction 10* but is directed downwards at an angle and ends just above the trough belt 22.

For depositing a portion P, the feeder 21 and the trough belt 22 are driven at the same speed in order to avoid folding of the portions P in the trough M when depositing, or better dropping, the portions P. The trough belt 22 is driven at the same speed as the feeder 21. Between the insertion of the individual portions P, the trough belt 22 and/or the feeder 21 can be stopped in each case.

A camera 26 fixed above the trough belt 22 is directed towards the area downstream, in particular immediately downstream, of the feeder 21, with the aid of which the actual arrangement of the portions P in the troughs M can be determined, both quantitatively and qualitatively, i.e., already directly in the packaging machine 100.

Figure 2A:
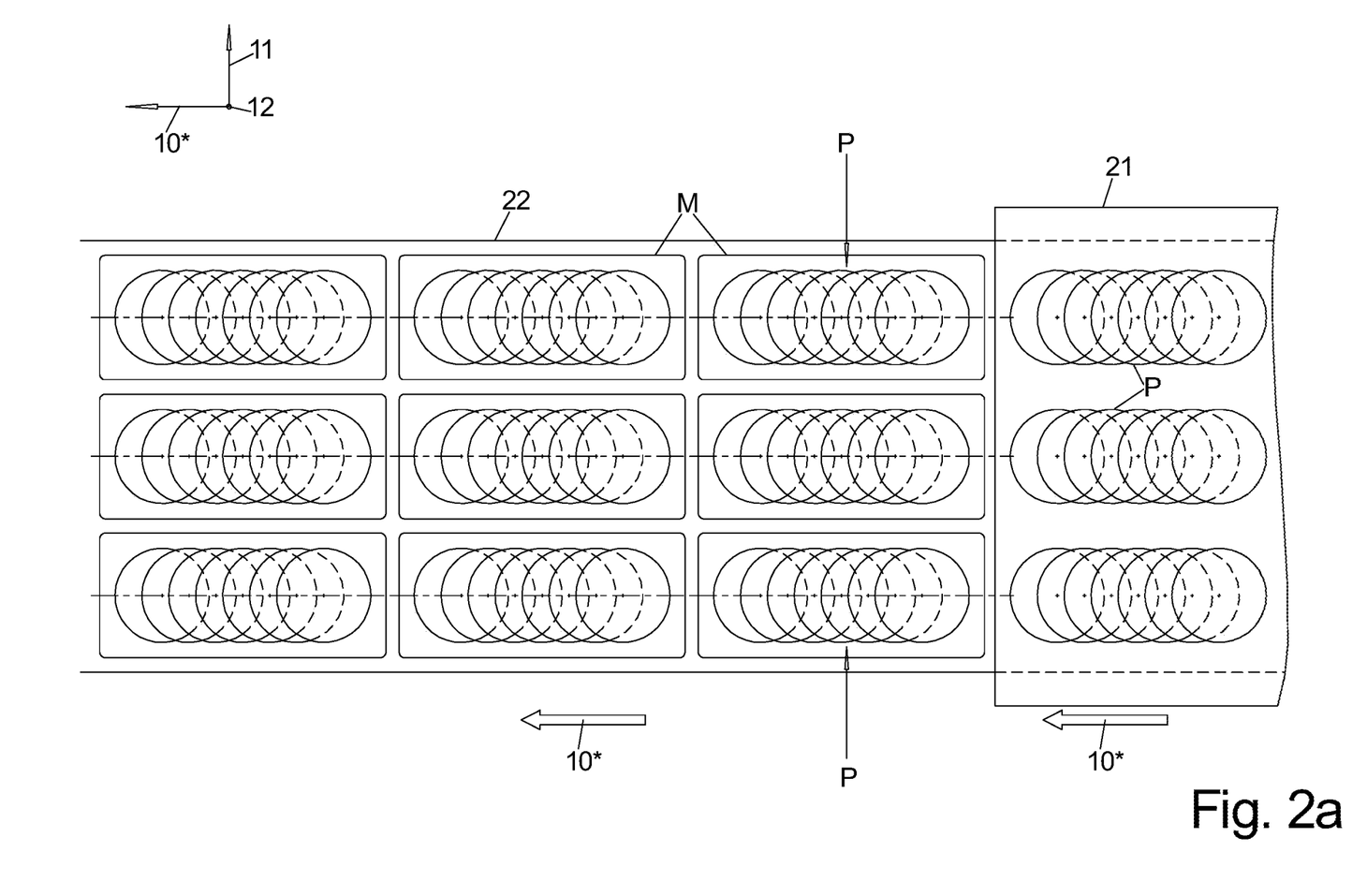
FIG. 2a: in top view, the area of the feeder as well as the downstream part of the trough belt with the portions already placed in the troughs in this part of the trough belt.

FIG. 2a shows the situation in the top view with the front end area of the feeder 21 and the trough belt 22 protruding thereunder, in whose visible troughs M a portion P is already deposited, each in one trough M.

Figure 1B:
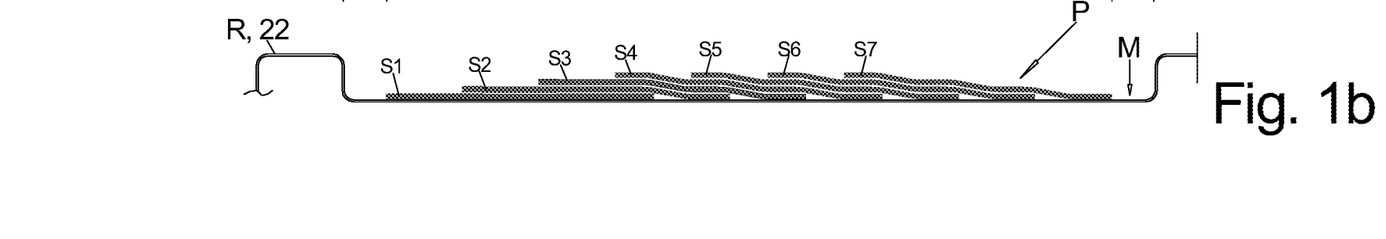
FIGS. 1b, 2b: a single filled trough in the side view and the top view as enlargements from FIGS. 1a and 2a, respectively, with the slices of the portion in the ideal position in the trough M, i.e., in the target arrangement, FIGS. 3a, b: the same views as in FIGS. 1b and 2b, but with the portion too far forward in the trough and partially resting on the edge of the trough.
Figure 2B:
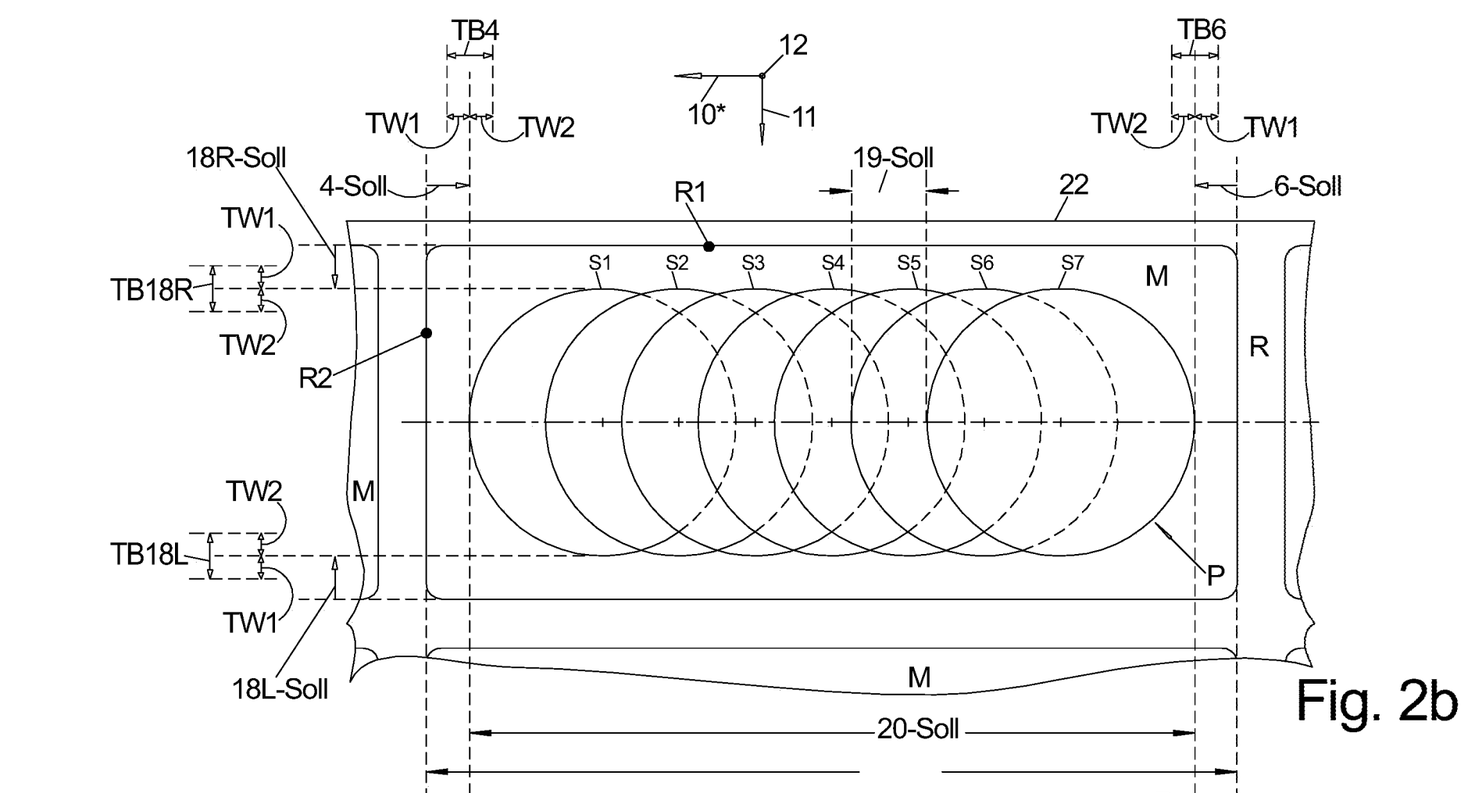

FIGS. 1b, 2b show the situation in side view and top view for only one single trough M with a single portion P lying therein, consisting in this case of seven slices S1 to S7.

FIG. 2b shows in top view the target arrangement of the deposited portion P in the trough M, with corresponding target arrangement values stored in the control system. In detail:

In the transverse direction 11, the portion P is to lie centrally to the edges R of the trough M on both sides, with a target transverse distance 18L-Soll on the left and a target transverse distance 18R-Soll on the right, as seen in the passage direction 10*, measured in each case from the lateral trough edge to the portion P. Each of these two target arrangement values lies on the left and right side of the trough. Each of these two target arrangement values lies within a tolerance range TB, which extends from the target value in the direction of the trough center by a tolerance value TW2 and in the direction of the lateral trough edge by a tolerance value TW1.

In the longitudinal direction (e.g., passage direction 10*), the portion P is to be centered with respect to the front and rear edges R of the trough M with a front target initial distance 4-Soll measured in the longitudinal direction 10* and a rear target final distance 6-Soll measured in the longitudinal direction 10*, in each case measured from the front or rear trough edge to the portion P. Each of these two target arrangement values lies within a tolerance range TB which extends from the target value in the direction of the center of the trough by a tolerance value TW2 and in the direction of the lateral edge of the trough by a tolerance value TW1.

Also within the portion P with equal target slice spacings 19-Soll between each two successive panes S of the portion P, whereby also to the target slice spacing 19-Soll a tolerance range TB19—not shown—is stored in the control 100* (e.g., control unit or control system), which is composed of a negative tolerance value TW- and a positive tolerance value TW+.

For a correct position of the portion B in the trough, it is of course also a prerequisite that the trough is in the correct position at the discharge point and at the discharge time—at which it moves forward—and also at the time at which the actual arrangement is recorded by means of the camera 26 with the trough belt 22 stopped.

At this determination time, the trough M of the trough belt 22 should be in such a position that, in the transverse direction 11, the right edge R of the trough M runs above or below a machine-fixed reference point R1 and, in the passage direction 10*, the front edge R runs above or below a machine-fixed reference point R2. The reference point R1 lies in the center of a tolerance range—not shown—which extends in the transverse direction, and reference point R2 lies in the center of a tolerance range which extends in the passage direction 10*.

Figures 3A, 3B:
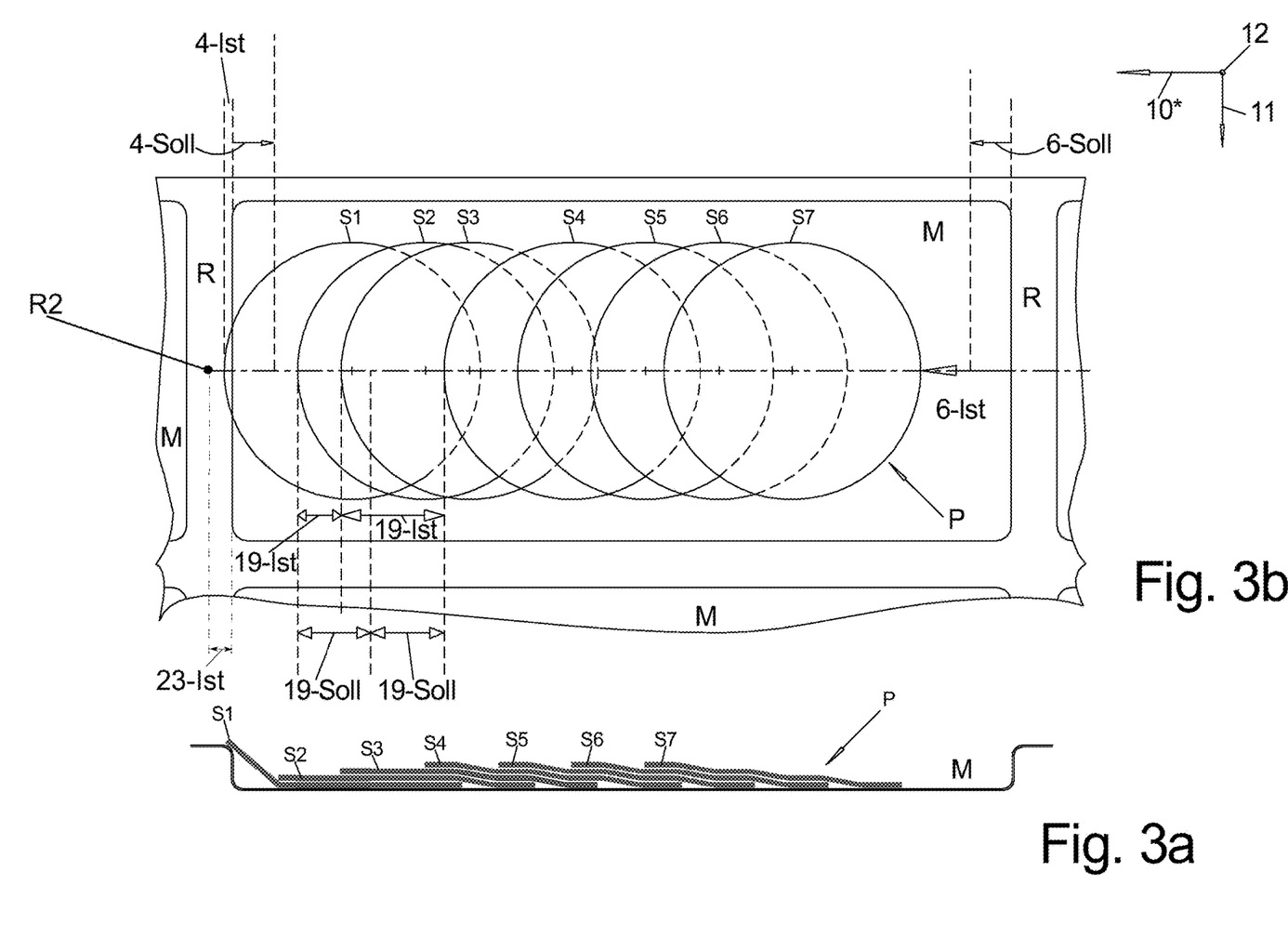

The further figures show actual arrangements of the portion P deviating from the target arrangement:

FIGS. 3a, b show—again in side view and top view—an actual arrangement of a portion P which has the most disadvantageous arrangement error, namely with the foremost end of the first slice S1 resting on the front edge R of the trough M. The first slice S1 is not sealed. This prevents a tight seal of this trough by sealing a sealing film also on this front edge R and the portion is a reject.

With the aid of the camera 26, the initial distance 4-Ist in the longitudinal direction 10* can be determined as well as the final distance 6-Ist with respect to the respective front and rear edges R of the trough M. The initial distance 4-Ist and the final distance 6-Ist can also be determined.

The start distance and end distance 4, 6 are measured from the edge of the trough in the direction of the center of the trough M in each case, and must therefore be a positive value if the position is correct. In the case of FIGS. 3a, b the actual start distance 4-Ist is even a negative value and actual end distance 4-Ist and 6-Ist are both outside the tolerance range TB4, TB6 of the respective distance 4, 6.

The production parameters for the portion arrangement must therefore be changed automatically and in a controlled manner so that the front and rear ends of the portion P lie within the tolerance range TB4 and TB6 of the initial distance 4-Soll and the target final distance 6-Soll.

From the determined position of the front and rear end of the portion, the actual portion length 20-Ist—not shown—can also be automatically calculated, which in this case corresponds to the target portion length 20-Soll, whereby a tolerance range TB20—not shown—is also stored in the control system 100* for the target portion length 20-Soll, which is composed of a negative tolerance value TW- and a positive tolerance value TW+.

However, the slice distance 19-Ist—with correct portion length 20-Soll=20-Ist—between slices S2 and S3 is much smaller and between slices S3 and S4 much larger than the slice distance 19-Soll.

Therefore, production parameters concerning the longitudinal position of slice S3 within portion P must be changed in such a way that afterwards all slices have the same target slice distance 19-Soll again.

Figure 4:
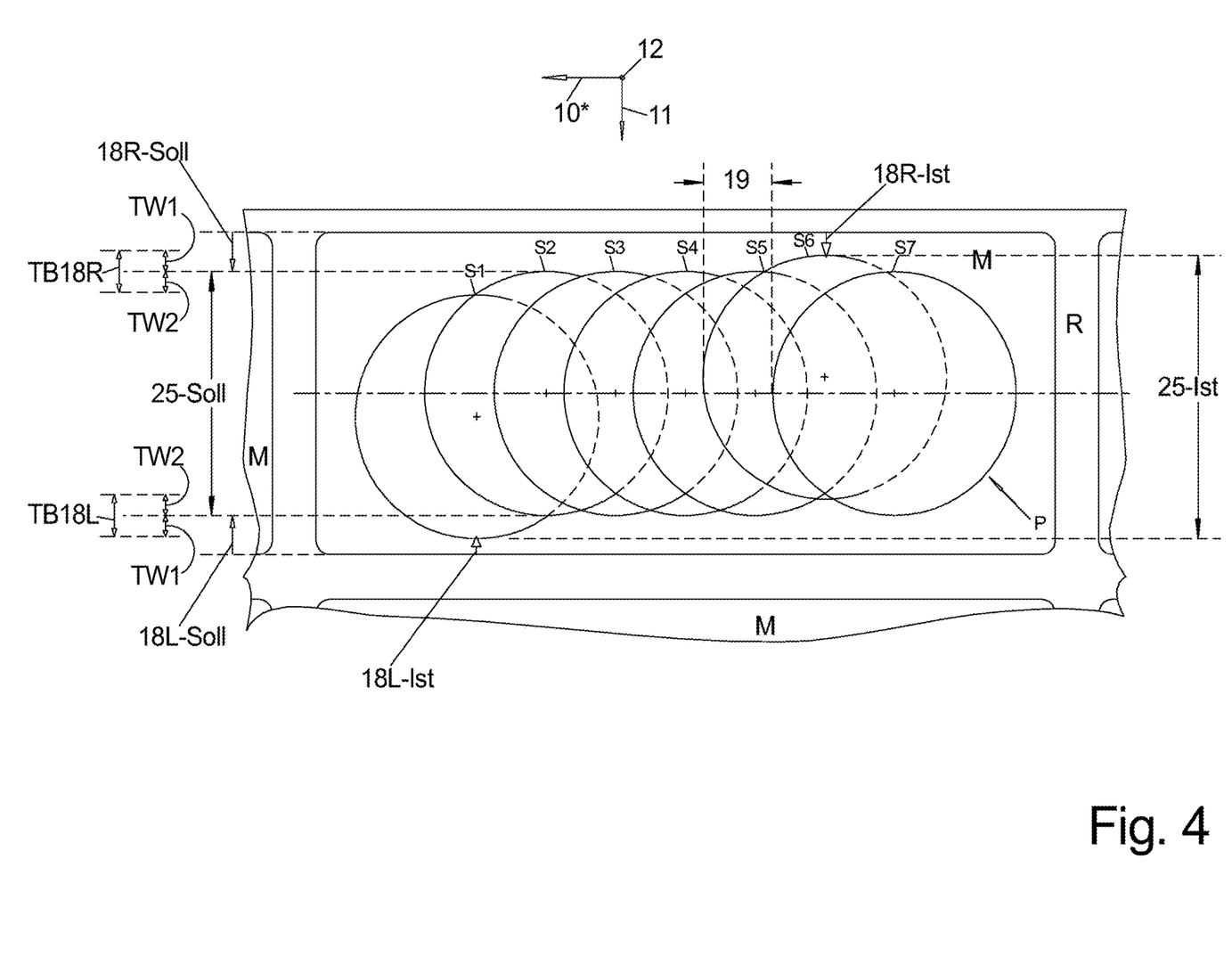
FIG. 4: the same view as in FIG. 2b, but within the portion with transverse offset of individual slices.

FIG. 4 shows an actual arrangement with problems with the transverse position of individual slices S1, S6 of portion P, one of which is too far to the left and the other too far to the right as viewed in the passage direction 10*.

This position, i.e., both the left and right actual transverse spacing 18L-Ist, 18R-Ist of these slices S1 and S6 projecting furthest to the side and thus of the entire portion, is also determined by the camera 26 and compared with the left and right target transverse spacing 18L-Soll, 18R-Soll stored in the target arrangement values. Since the actual transverse distances are outside the permissible tolerance range in each case, the control system 100* automatically changes the production parameters relating to the transverse position of these two slices in such a way that they are correctly positioned in the trough M for subsequent portions in the transverse direction, i.e., with a respective target transverse distance.

In addition or instead, the target transverse width 25-Soll of an entire portion can also be stored as a target arrangement value and compared with the actual transverse width 25-Ist, which is also too large here and also requires an adjustment of the corresponding, at least one production parameter.

Figure 5:
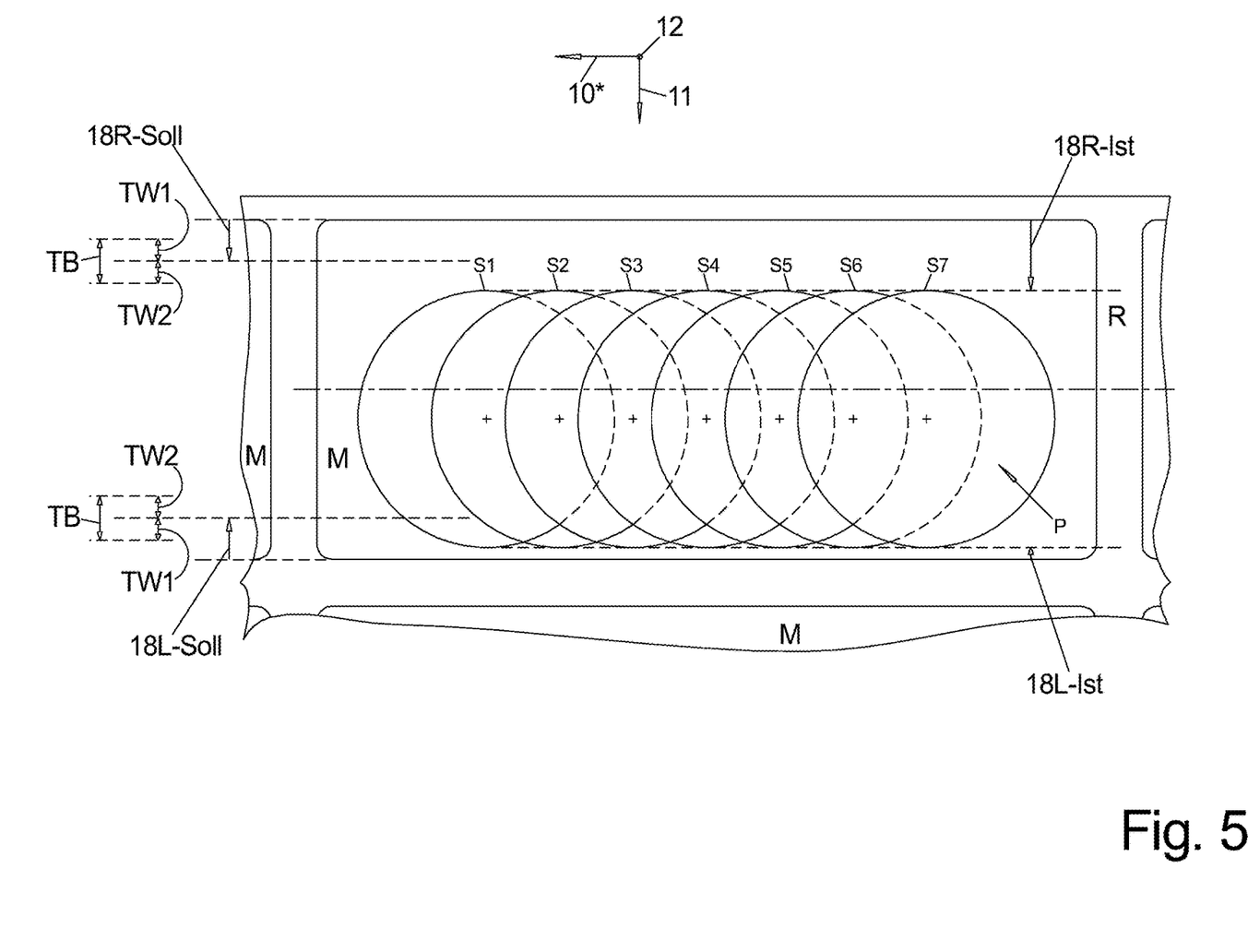
FIG. 5: the same view as in FIG. 2b, but the entire portion with transverse offset in the trough M.

In contrast, FIG. 5 shows a deviation in which all slices S of the portion P are in line in the passage direction 10* without relative transverse deviation to each other, but the entire portion P is too close to the left edge R of the trough in the passage direction 10*, i.e., 18L-Ist is too small and also lies outside the tolerance range TB18L around the 18L-Soll, which results in an unattractive exterior of the portion P.

In this case, all production parameters that influence the transverse position of all slices S of the portion P must be automatically readjusted in such a way that this deficiency is eliminated for subsequent portions, thereby achieving a portion P that is visually appealing in the package.

Figure 6:
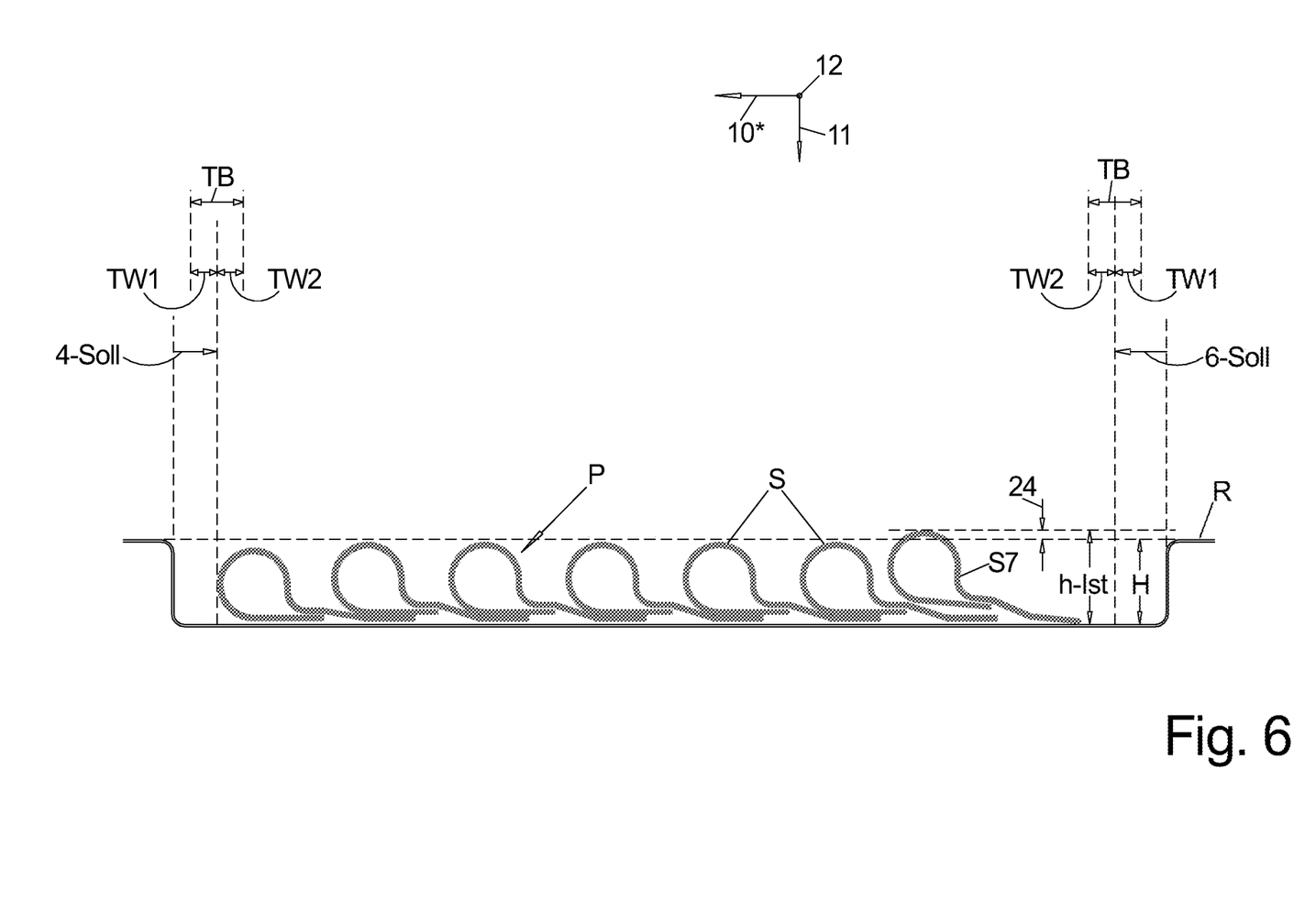
FIG. 6: the same view as in FIG. 1b, but with a portion of folded slices in the trough.

FIG. 6 shows a target arrangement in which the portion P extends beyond the free inner height H of the trough and thus beyond the height level of the edge R around the trough.

As a result, when the sealing film—not shown—is sealed on, a bulge can occur which is not visually appealing and can also lead to wrinkling and thus leakage of the sealing film on the edge R of the trough.

A portion that is too high occurs, for example, if it is a shingled portion of folded slices S, which are thus folded about a folding axis running parallel to their main plane, usually by means of a so-called folding rod, between cutting and hitting the portioning belt and thus form an approximately drop-shaped contour in this side view of FIG. 6. If this drop-shaped contour has a height h which is greater than the free inner height h of the trough M, it projects too far upwards, as indicated by a solid line on the slice S7.

There is usually no stored tolerance parameter for this arrangement parameter in the form of the height h of the portion, because a folded portion that is too low is generally visually acceptable, but a portion that rises too high above the height level of the edge R is not acceptable.

Figure 7:
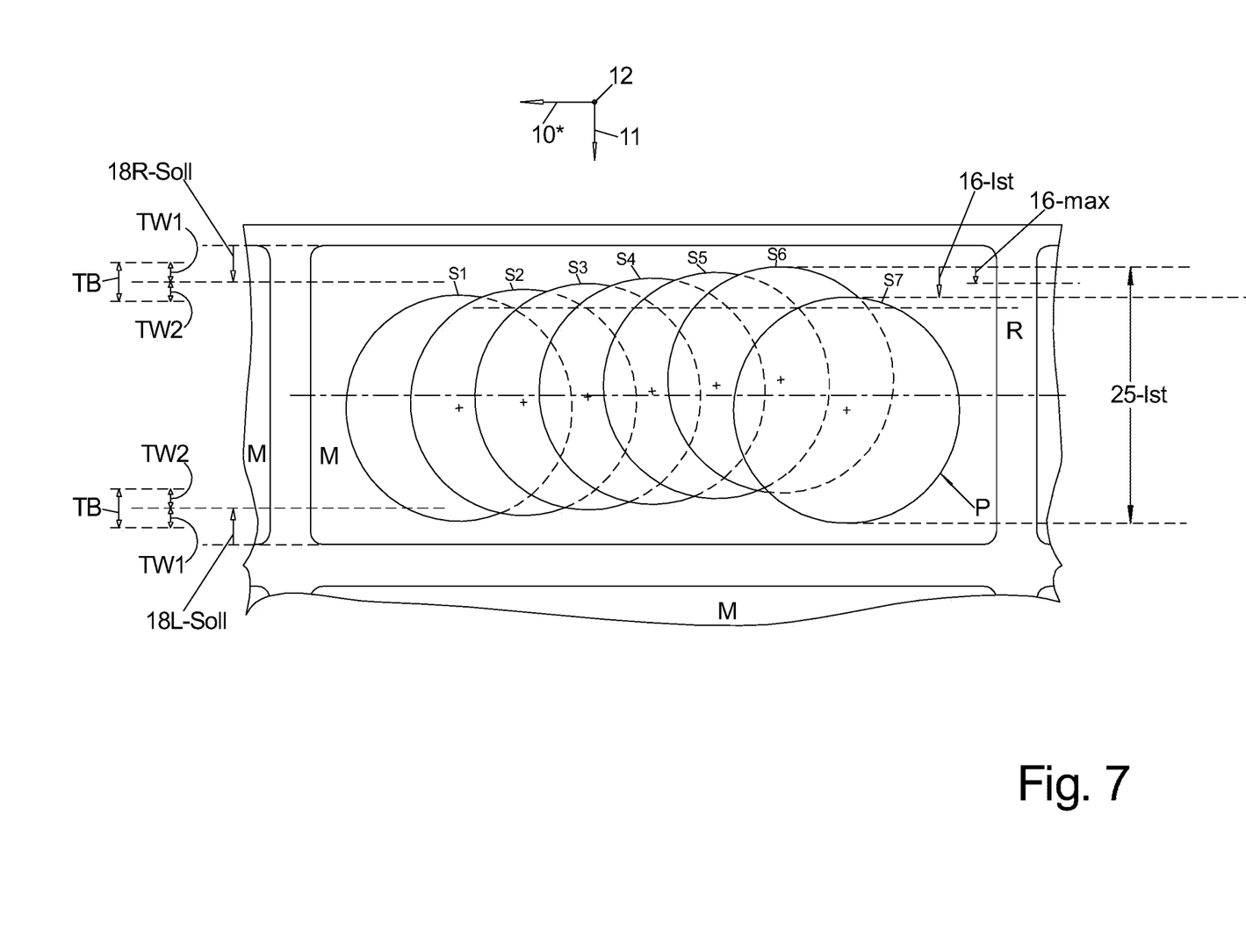
FIG. 7: the same view as FIG. 5, but with different transverse positions of the individual slices within the portion.

FIG. 7, like FIGS. 4 and 5, shows a portion where there are problems with the transverse positions of the slices S1 to S7.

The maximum permissible transverse offset 16-max between two slices following each other in the passage direction 10* can also be stored in the arrangement values.

In FIG. 7, the stacking position moves further and further to the right in the transverse direction, starting with the first slice S1 and ending with the penultimate slice S6, whereby the transverse offset between two successive slices is obviously below the maximum permissible transverse offset 16-max.

The last target S7, on the other hand, is shifted strongly to the left compared to the penultimate slice S6, and the transverse offset 16-Ist between S6 and S7 is obviously larger than the maximum permissible transverse offset 16-max.

If such a target arrangement value exists, at least one production parameter must be changed in order to reduce the transverse offset between S6 and S7. Otherwise, the portion is well within the tolerance ranges TB for the right and left edges 18R-Solt and 18L-Solt.

LIST OF REFERENCES 1 slicing machine, slicer
1* control system
2 base frame
3 blades
3 rotation axis
3" blade plane, cutting plane
3a cutting edge
4 initial distance
5 cutting eyelet
6a-d end distance
7 cutting unit
8 upper product guide, upper guide belt
9 lower product guide, lower guide belt
10 feed direction, longitudinal direction, axial direction
10* passage direction through machine
11 1$^{st}$ transverse direction (width slicer)
12 2$^{nd}$ cross direction (height direction caliber)
13 portion production unit
14 portion delivery unit
15 package delivery unit
16 transverse offset
17 conveyor unit
17a, b, c portioning belt, discharge conveyor
18 transverse offset
19 slice spacing
20 portion length
21 feeder
22 trough belt
23 trough longitudinal distance
24 height distance
25 cross width
26 camera
100 packing machine
500 packing device
HA target height distance
M trough, packing trough
P portion
R edge
R1, R2 reference point
S slice
V packaging element

The invention claimed is:

1. A method for automatically achieving a predetermined portion arrangement of a portion of slices deposited on a packaging element, the method comprising:
    determining an actual arrangement in a deposited state of the portion,
    comparing the actual arrangement with a predetermined target arrangement, and
    upon detecting a deviation of the actual arrangement from the target arrangement by more than a predetermined tolerance range,
        automatically changing one or more production parameters of an upstream portion production unit and/or an upstream portion delivery unit and/or an upstream packaging delivery unit as a function of the detected deviation in such a way that an actual arrangement in a deposited state of an additional portion lies within all tolerance ranges around desired arrangement values of the predetermined target arrangement,
    wherein the actual arrangement is determined with the packaging element being stationary, immediately after the portion has been deposited on the packaging element,
    wherein the packaging element comprises a packaging trough for receiving the portion, and the predetermined target arrangement comprises, as a target arrangement value, a target trough longitudinal distance in a longitudinal direction between the trough and a reference point of the environment,
    wherein, when an actual trough longitudinal distance is greater than the target trough longitudinal distance by more than an associated tolerance value, as a production parameter of the upstream packaging delivery unit, delivery speed thereof is increased in such a way that thereafter an actual trough longitudinal distance of an additional trough lies within a respective tolerance range around the target trough longitudinal distance, and
    wherein a reverse procedure is followed in case the actual trough longitudinal distance is smaller than the target trough longitudinal distance by more than an associated tolerance value.

2. The method according to claim 1, wherein the detecting the deviation takes place without contact.

3. The method according to claim 1, wherein the automatically changing the production parameters only takes place when the detected deviation has been determined as a repeated error.

4. The method according to claim 1, wherein the predetermined target arrangement comprises, as target arrangement values, a positive target initial distance and a positive target final distance in a longitudinal direction between the portion and the packaging element.

5. The method according to claim 1, wherein the predetermined target arrangement comprises as a target arrangement value a positive target transverse distance of the portion towards at least one edge of the packaging element,
    in case of a too small positive or even negative actual initial transverse distance of the portion,
    either as a production parameter of the upstream portion delivery unit, delivery speed thereof is reduced,
    or as a production parameter of the upstream packaging delivery unit, delivery speed thereof is increased in such a way,
    that there is no longer a negative actual transverse distance for an additional portion.

6. The method according to claim 1, wherein the predetermined target arrangement comprises as target arrangement values a positive target initial distance as well as a positive target final distance in a longitudinal direction between the portion and the packaging element, when an actual initial distance is greater than an actual final distance by more than a tolerance value, either as a production parameter of the upstream portion delivery unit, delivery speed thereof is reduced, or as a production parameter of the upstream packaging delivery unit, delivery speed thereof is increased in such a way, that thereafter the actual initial distance as well as an actual final distance for an additional portion lie within a respective tolerance range around the target initial distance or the target final distance, and wherein a reverse procedure is followed in case the actual initial distance is smaller than the actual final distance by more than a tolerance value.

7. The method according to claim 1, wherein the predetermined target arrangement comprises as a target arrangement value a target slice distance in a longitudinal direction between the slices of the portion, when an actual slice distance is smaller by more than a tolerance value at one point of the portion, as a production parameter of the upstream portion production unit, feed speed of the upstream production unit is increased at a corresponding point for an additional portion in such a way, that thereafter an actual slice distance for the additional portion lies within a tolerance range around the target slice distance, and wherein a reverse procedure is followed in case of a slice spacing which is greater by more than a tolerance value at one point of the portion.

8. The method according to claim 1, wherein the predetermined target arrangement comprises as target arrangement value a target length of the portion in a longitudinal direction, when an actual length of the portion is greater than the target length by more than a tolerance value, as a production parameter of the upstream portion production unit, feed speed thereof between slices of an additional portion is reduced accordingly in such a way that thereafter an actual length of the additional portion thus produced lies within a tolerance range around the target length.

9. The method according to claim 1, wherein the predetermined target arrangement comprises as a target arrangement value a maximum permissible target transverse offset transverse to a longitudinal direction between the slices of the portion, in case of an actual transverse offset which is greater by a transverse distance tolerance at one point of the portion, as a production parameter of the upstream portion production unit, a parameter relevant for transverse positioning generation is changed in such a way that thereafter an actual transverse offset for an additional portion is smaller than the maximum permissible target transverse offset.

10. The method according to claim 1, wherein the predetermined target arrangement comprises as a target arrangement value a maximum target transverse width of the portion transverse to a longitudinal direction of the portion, in case of an actual transverse width of the portion that is larger than the maximum target transverse width, the production parameters of the upstream portion production unit relevant for transverse positioning generation are changed in such a way that thereafter an actual transverse distance of an additional portion is smaller than the maximum target transverse distance.

11. The method according to claim 1, wherein the packaging element comprises a packaging trough for receiving the portion, the predetermined target arrangement comprises as a target arrangement value either a negative target height distance in a vertical direction between an upper edge of the trough and the portion, or a maximum target height of the portion corresponding at most to a free inner height of the trough, with a positive actual height distance or an actual height of the portion that exceeds the maximum target height, as a production parameter of the upstream portion production unit, a parameter thereof relevant for height of the portion is changed in such a manner that thereafter an additional portion does not have a positive actual height distance or an actual height that exceeds the maximum target height.

12. The method according to claim 1, wherein the portion production unit, the portion delivery unit and the packaging delivery unit are part of a packaging device, and wherein the method further comprises automatically controlling the packaging device, which comprises:

controlling a speed of a portioning belt, and/or controlling a step length of a stepwise movable portioning belt, and/or controlling a time interval between individual cutting operations and/or controlling a speed of a blade of the portion production unit, and/or controlling a speed and/or a distance of transverse offset of a transverse offset belt, and/or controlling a feed force of an upper product guide and/or a lower product guide of the portion production unit, and/or controlling a running speed and/or transverse position of a trough belt, and/or controlling a running speed of a feeder.

13. The method according to claim 1, wherein the automatically changing the production parameters only takes place when the detected deviation has been detected at least three times.

14. A packaging device comprising:

a packaging machine for packaging a shingled portion of slices deposited on a packaging element that comprises a packaging trough for receiving the portion, a portion delivery unit, which delivers the portion to the packaging machine, a portion production unit, which produces the portion, a packaging delivery unit, which delivers the packaging element to the packaging machine, and a control unit, wherein the packaging machine comprises a sensor for determining a portion arrangement of the portion relative to the packaging element, the control unit is configured to compare the portion arrangement with a predetermined target arrangement, and to control production parameters of the portion production unit and/or the portion delivery unit and/or the packaging delivery unit based on a deviation of the portion arrangement from the predetermined target arrangement, the packaging machine is configured to determine the portion arrangement with the packaging element being stationary, after the portion has been deposited on the packaging element, the predetermined target arrangement comprises, as a target arrangement value, a target trough longitudinal distance in a longitudinal direction between the trough and a reference point of the environment, and when an actual trough longitudinal distance is outside a tolerance range around the target trough longitudinal distance, the control unit is configured to adjust delivery speed of the packaging delivery unit in such a way that thereafter an actual trough longitudinal distance of an additional trough lies within the tolerance range around the target trough longitudinal distance.

15. The packaging device according to claim 14, wherein the control unit is configured to control at least all moving parts of the packaging machine and is in data connection with a controller of the portion delivery unit and/or the portion production unit and/or the packaging delivery unit.

16. The packaging device according to claim 14, wherein the portion production unit comprises a portioning belt, and the portion delivery unit is functionally arranged between the portioning belt and the packaging machine.

17. The packaging device according to claim 14, wherein the packaging machine comprises a deep-drawing packaging machine.

18. The packaging device according to claim 14, wherein the packaging element comprises a packaging trough of a trough belt.

19. The packaging device according to claim 14, wherein the packaging machine is configured to determine the portion arrangement immediately after the portion has been deposited on the packaging element.

20. A method for automatically achieving a predetermined portion arrangement of a portion of slices deposited on a packaging element, the method comprising:

determining an actual arrangement in a deposited state of the portion, comparing the actual arrangement with a predetermined target arrangement, and upon detecting a deviation of the actual arrangement from the target arrangement by more than a predetermined tolerance range, automatically changing one or more production parameters of an upstream portion production unit and/or an upstream portion delivery unit and/or an upstream packaging delivery unit as a function of the detected deviation in such a way that an actual arrangement in a deposited state of an additional portion lies within all tolerance ranges around desired arrangement values of the predetermined target arrangement, wherein the actual arrangement is determined with the packaging element being stationary, after the portion has been deposited on the packaging element, wherein the packaging element comprises a packaging trough for receiving the portion, wherein the predetermined target arrangement comprises, as a target arrangement value, either a negative target height distance in a vertical direction between an upper edge of the trough and the portion, or a maximum target height of the portion corresponding at most to a free inner height of the trough, and wherein, with a positive actual height distance or an actual height of the portion that exceeds the maximum target height, as a production parameter of the upstream portion production unit, a parameter thereof relevant for height of the portion is changed in such a manner that thereafter an additional portion does not have a positive actual height distance or an actual height that exceeds the maximum target height.

\* \* \* \* \*